United States Patent
Conrow et al.

(10) Patent No.: US 9,415,546 B2
(45) Date of Patent: *Aug. 16, 2016

(54) SYSTEM AND METHOD FOR CONTROLLING MATERIAL DROP VOLUME IN THREE DIMENSIONAL OBJECT PRINTING

(71) Applicant: Xerox Corporation, Norwalk, CT (US)

(72) Inventors: Brian R. Conrow, Webster, NY (US); Howard A. Mizes, Pittsford, NY (US); Paul A. Hosier, Rochester, NY (US); Jeffrey J. Folkins, Rochester, NY (US); Robert J. Kleckner, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 327 days.

This patent is subject to a terminal disclaimer.

(21) Appl. No.: 14/167,729

(22) Filed: Jan. 29, 2014

(65) Prior Publication Data
US 2015/0210011 A1 Jul. 30, 2015

(51) Int. Cl.
| | | |
|---|---|---|
| B29C 67/00 | (2006.01) | |
| B33Y 50/02 | (2015.01) | |
| B33Y 10/00 | (2015.01) | |
| B33Y 30/00 | (2015.01) | |

(52) U.S. Cl.
CPC .......... B29C 67/0088 (2013.01); B29C 67/0059 (2013.01); *B33Y 10/00* (2014.12); *B33Y 30/00* (2014.12); *B33Y 50/02* (2014.12)

(58) Field of Classification Search
CPC ............ B29C 67/0088; B29C 67/0059; B29C 67/0085; B33Y 50/02; B41J 29/393
See application file for complete search history.

(56) References Cited

U.S. PATENT DOCUMENTS

| | | | |
|---|---|---|---|
| 5,490,962 A * | 2/1996 | Cima | A61F 2/022 156/272.8 |
| 5,860,679 A | 1/1999 | Fukuda et al. | |
| 6,989,115 B2 | 1/2006 | Russell et al. | |
| 7,372,555 B2 | 5/2008 | Watanabe | |
| 7,552,986 B2 * | 6/2009 | Mizes | B41J 2/155 347/116 |
| 7,747,341 B2 | 6/2010 | Dubois et al. | |
| 7,931,914 B2 * | 4/2011 | Pryce Lewis | A61J 3/10 424/422 |
| 8,017,055 B2 * | 9/2011 | Davidson | B29C 41/12 264/308 |
| 8,506,038 B2 | 8/2013 | Mizes et al. | |
| 8,602,518 B2 | 12/2013 | Mizes et al. | |

(Continued)

FOREIGN PATENT DOCUMENTS

| | | |
|---|---|---|
| EP | 2 042 324 A2 | 4/2009 |
| WO | 2006/034012 A2 | 3/2006 |

OTHER PUBLICATIONS

Gibson et al.; Additive Manufacturing Technologies: Rapid Prototyping to Direct Digital Manufacturing; 2010; pp. 195-198 and p. 201; Springer Science + Business Media, LLC; 2010.

*Primary Examiner* — Alison L Hindenlang
*Assistant Examiner* — Emmanuel S Luk
(74) *Attorney, Agent, or Firm* — Maginot Moore & Beck, LLP

(57) ABSTRACT

A printer uses closed loop control to keep material drops ejected by a printhead within a predetermined range. The printer forms at least two objects on a support member and then operates a specular sensor array to obtain image data of the two objects on the support member. The two objects have different predetermined heights to enable a controller in the printer to identify the mass or volume of the material drops forming the objects to adjust operational parameters of the printer to maintain the mass or volume of the material drops in the predetermined range.

12 Claims, 4 Drawing Sheets

(56) References Cited

U.S. PATENT DOCUMENTS

| | | | |
|---|---|---|---|
| 2002/0008335 A1* | 1/2002 | Leyden | B29C 41/12 |
| | | | 264/494 |
| 2002/0089561 A1 | 7/2002 | Weitzel et al. | |
| 2002/0104973 A1* | 8/2002 | Kerekes | B29C 67/0059 |
| | | | 250/559.2 |
| 2006/0111807 A1 | 5/2006 | Gothait et al. | |
| 2009/0167817 A1 | 7/2009 | Orr | |
| 2010/0125356 A1* | 5/2010 | Shkolnik | B29C 67/0088 |
| | | | 700/98 |
| 2010/0303281 A1 | 12/2010 | Wu et al. | |
| 2011/0242187 A1 | 10/2011 | Mongeon et al. | |
| 2012/0164256 A1* | 6/2012 | Swanson | B29C 67/0055 |
| | | | 425/162 |
| 2013/0316081 A1* | 11/2013 | Kovalcik | B22F 3/1055 |
| | | | 427/265 |
| 2015/0147424 A1* | 5/2015 | Bibas | B29C 67/0088 |
| | | | 425/150 |
| 2015/0375548 A1* | 12/2015 | Yamasaki | B41J 29/38 |
| | | | 347/5 |

* cited by examiner

SYSTEM AND METHOD FOR CONTROLLING MATERIAL DROP VOLUME IN THREE DIMENSIONAL OBJECT PRINTING

TECHNICAL FIELD

The device disclosed in this document relates to printers that produced three dimensional objects and, more particularly, to accurate detection of the mass of material drops used to produce the three dimensional objects in such printers.

BACKGROUND

Digital three dimensional manufacturing, also known as digital additive manufacturing, is a process of making a three dimensional solid object of virtually any shape from a digital model. Three dimensional printing is an additive process in which successive layers of material are formed on a substrate in different shapes. Three dimensional printing is distinguishable from traditional object-forming techniques, which mostly rely on the removal of material from a work piece by a subtractive process, such as cutting or drilling.

Some printers that produce three dimensional objects use a flat staging area onto which one or more printheads eject ink drops that build layers of material to form an object. The printhead is typically substantially smaller than the stage so either the printhead or the stage are moved in a process direction and cross-process direction, which are orthogonal to one another in the same plane, multiple times to form each layer of the object. Additionally, one of the stage and the printhead need to be moved in a vertical direction relative to the plane of the process/cross-process direction plane to maintain an appropriate distance between the printhead and the object being built.

Provided that the printhead(s) are at least as wide in the cross-process direction as the object to be produced, drop placement control in the cross-process direction is not required if the spacing of the inkjets in the printheads is sufficient to form the object in that direction. If the resolution of the inkjets is less than the resolution needed for formation of the object in the cross process direction, or if the printhead is narrower than the object being produced by the printing, then multiple passes of the printhead and translation of the printhead in the cross process direction are required to fabricate the object. Resolution of the drop placement in the process direction can be controlled by regulating the velocity of translation for either the stage or the printhead. The vertical separation, or height, is typically controlled by maintaining the mass or volume of the material drops ejected by the printhead in some predetermined range. The mass or volume of the drops are usually calibrated to the range during some type of initial manufacturing set-up or prior to the performance of a print job. Alternatively, a planarization technique can be used to remove excess material from a printed layer to ensure the layer does not exceed the desired height. The addition of a planer adds expense to the printer and increases the time needed to produce an object. The drop mass/volume calibration can drift due to several factors, including temperature, building material consistency within a batch of building material, building material consistency from one batch of building material to another batch of building material, cooling rates, print volume density effects, and other operational parameters. Assuring more accurate drop placement in a printer that produces three dimensional objects is desirable.

SUMMARY

A printer that produces three dimensional objects with more accurate material drop placement includes a planar support member, a printhead positioned to eject drops of material towards the support member, at least one of the planar support member and the printhead being configured to move relative to the other of the planar support member and the printhead, a specular sensor array having an illumination source and a plurality of light receivers, the illumination source being configured to emit light at a predetermined angle to the planar support member and each light receiver being configured to generate an electrical signal corresponding to light reflected from material on the planar support member, and a controller operatively connected to the planar support member, the printhead, and the specular sensor array. The controller is configured to operate the printhead to form at least two objects on the planar support member, operate one of the planar support member and the printhead to move relative to the other of the planar support member and the printhead to enable the at least two objects to have a length in a cross-process direction that substantially covers a width of the printhead across the planar support member and have a length in the process direction that extends along a portion of the planar support member in a process direction, operate the specular sensor array to direct light towards the planar support member and receive the electrical signals generated by the light receivers as one of the specular sensor array and the planar support member move relative to the other of the specular sensor array and the planar support member, analyze image data corresponding to the electrical signals received from the light receivers to identify one of a slope of a reflected light received by one of the light receivers and a height of one of the two objects, and adjust an operational parameter of the printhead in response to the analyzed image data indicating a mass of material drops ejected by an inkjet in the printhead has change with reference to a predetermined material drop mass.

A method of operating a printer to ensure more accurate material drop placement includes operating a printhead to form at least two objects on a planar support member, the at least two objects having a length in a cross-process direction that substantially covers a width of the printhead across the planar support member and the at least two objects having a length in the process direction that extends along a portion of the planar support member in a process direction, one of the planar support member and the printhead being configured to move relative to the other of the planar support member and the printhead, operating one of the planar support member and the printhead to move relative to the other of the planar support member and the printhead during formation of the at least two objects, operating a specular sensor array to direct light towards the planar support member and generate electrical signals corresponding to reflected light received by the specular sensor array as one of the specular sensor array and the planar support member move relative to the other of the specular sensor array and the planar support member, analyzing image data corresponding to the electrical signals received from the specular sensor array to identify one of a slope of reflected light received by the specular sensor array and a height of one of the two objects, and adjusting an operational parameter of the printhead in response to the analyzed image data indicating a mass of material drops ejected by an inkjet in the printhead has change with reference to a predetermined material drop mass.

BRIEF DESCRIPTION OF THE DRAWINGS

The foregoing aspects and other features of a printer that generates a three dimensional object are explained in the following description, taken in connection with the accompanying drawings.

DETAILED DESCRIPTION

Figure 1:
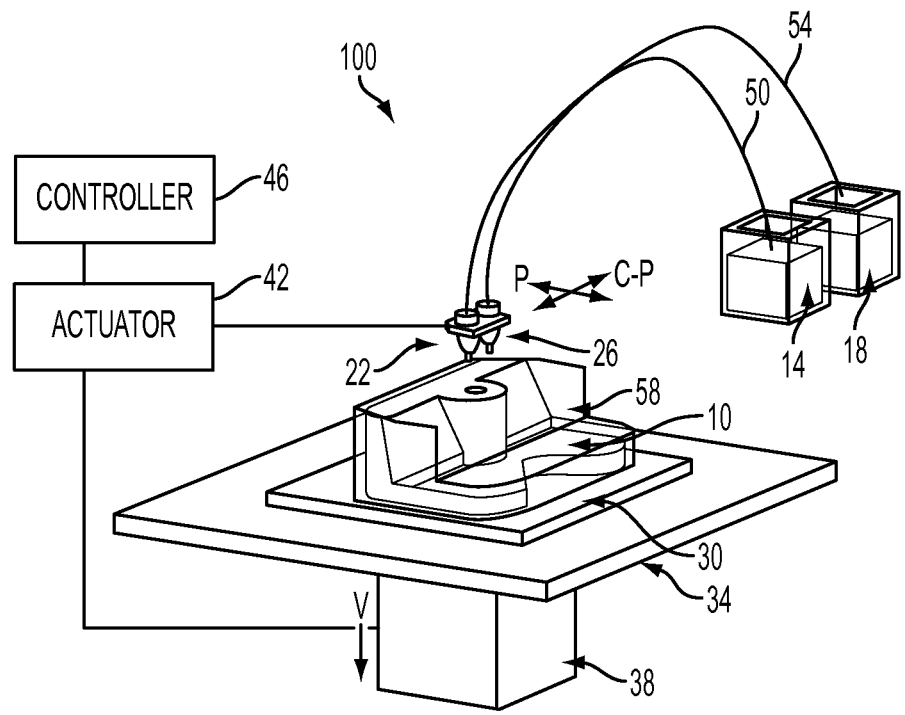
FIG. 1 is a perspective view of components in a printer that produces three dimensional objects.

For a general understanding of the environment for the device disclosed herein as well as the details for the device, reference is made to the drawings. In the drawings, like reference numerals designate like elements.

FIG. 1 shows a configuration of components in a printer 100, which produces a three dimensional object or part 10. The printer 100 includes a support material reservoir 14, a building material reservoir 18, a pair of inkjet printheads 22, 26, a build substrate 30, a planar support member 34, a columnar support member 38, an actuator 42, and a controller 46. Conduit 50 connects printhead 22 to support material reservoir 14 and conduit 54 connects printhead 26 to building material reservoir 18. Both inkjet printheads are operated by the controller 46 with reference to three dimensional image data in a memory operatively connected to the controller to eject the support and building materials supplied to each respective printhead. The building material forms the structure of the part 10 being produced, while the support structure 58 formed by the support material enables the building material to maintain its shape while the material solidifies as the part is being constructed. After the part is finished, the support structure 58 is removed by washing, blowing, or melting.

The controller 46 is also operatively connected to at least one and possibly more actuators to control movement of the planar support member 34 and the printheads 22, 26 relative to one another. That is, one or more actuators can be operatively connected to structure supporting the printheads to move the printheads in a process direction and a cross-process direction with reference to the surface of the planar support member. Alternatively, one or more actuators can be operatively connected to either the planar support member 34 or the columnar support member 38 to move the surface on which the part is being produced in the process and cross-process directions. As used herein, the term "process direction" refers to movement along one axis in the surface of the planar support member 34 and "cross-process direction" refers to movement along an axis in the planar support member surface that is orthogonal to the process direction axis in that surface. These directions are denoted with the letters "P" and "C-P" in FIG. 1. The printheads 22, 26 and the planar support member 34 also move in a direction that is orthogonal to the planar support member 34. This direction is called the vertical direction in this document, is parallel to the columnar support member 38, and is denoted with the letter "V" in FIG. 1. Movement in the vertical direction can be effected by one or more actuators operatively connected to the columnar member 38, by one or more actuators operatively connected to the printheads 22, 26, or by one or more actuators operatively connected to both the columnar support member 38 and the printheads 22, 26. These actuators in these various configurations are operatively connected to the controller 46, which operates the actuators to move the columnar member 38, the printheads 22, 26, or both in the vertical direction.

As noted above, the mass/volume of the drops of the building material is usually set by a calibration method at the initial set-up of a printer. This calibrated drop mass/volume can drift due to temperature changes, consistency within a batch of building material, consistency variations from one batch of building material to another batch of building material, cooling rates, print volume density effects, and other operational parameters. To detect drop mass/volume changes that take the drops out of a predetermined range, a system and method have been developed that produce at least two test structures or objects on the planar support member and then generate image data from specular reflections of light directed towards the two objects and the planar support member.

Figure 2:
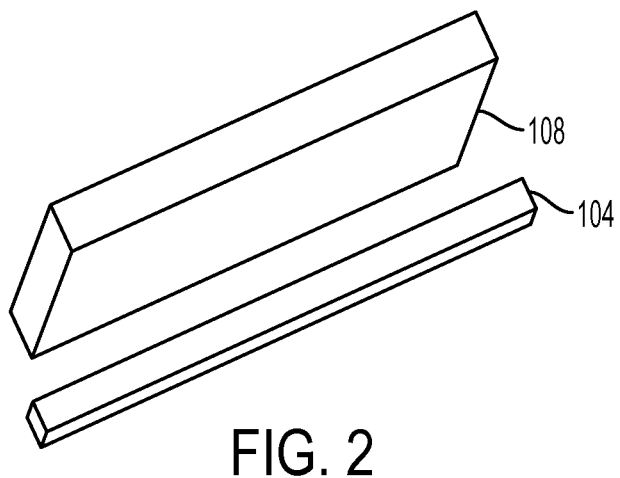
FIG. 2 depicts two test objects that can be used to identify the mass/volume of building material drops ejected by a printhead in the printer of FIG. 1.

An example of the two objects used to evaluate building material drop mass/volume is shown in FIG. 2. Both objects 104 and 108 are rectangular solids. Object 108 is a predetermined height that is greater than the predetermined height of object 104. In one embodiment, the ratio of the height of object 108 to the height of object 104 is 10:1. In that embodiment, object 108 is 1.0 mm tall and object 104 is 0.1 mm tall. The objects are formed on the build substrate 30 at predetermined positions and the objects have a predetermined width, which can be the same. Both objects extend across the build substrate by a distance that is at least as long as the width of the face of the building material printhead 26. This length enables all of the inkjets in the building material printhead to be used to produce the objects and, consequently, evaluated.

Figure 3:
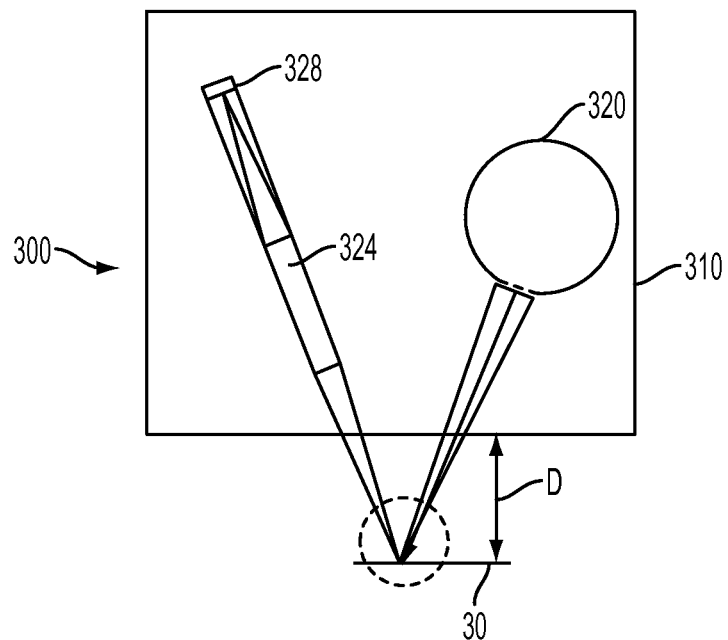
FIG. 3 is an end view of an image sensor module used to detect edges of test objects used to identify the mass/volume of building material drops.

An image sensor 300 generates image data that can be analyzed to identify the drop mass/volume for inkjets in the building material printhead. In the end view shown in FIG. 3, the image sensor module 300 includes an illumination source 320 and a photodetector array 328. The array 328 includes a plurality of semiconductor chips mounted on a printed circuit board in a linear array. Only one chip is shown in FIG. 3 since only the first chip in the array is visible from the end. A self-focusing lens 324 extends from one end of the array 328 to the other end. As is known, the lens 324 is comprised of a plurality of rods that focus reflected light towards at least one of the chips. Some chips may be positioned with respect to the rods in the lens 324 that the chip receives light from more than one rod in the lens 324. The illumination source 320, which also extends from one end of the array 328 to the other end, directs light at an angle towards the build substrate 30 on the planar support member 34 and the two objects 104 and 108 on the build substrate. The array 328, the lens 324, and the illumination source 320 are positioned in a housing 310 to form the image sensor 300. As the planar support member and the sensor module 300 move relative to one another, the member sensor 300 operates as a specular sensor that generates image data corresponding to specular light reflected from the build substrate 30 and the test objects 104, 108 on the build substrate and directed by the lens 324 to the array 328. Each chip in the photodetector array 324 is positioned at a fixed angle with respect to the build substrate 30 on the planar support member 34 and the illumination source 320. Specifically, the chips in the photodetector array are positioned to receive specular light reflected from the build substrate 30 or one of the two objects on the build substrate. "Specular," as used in this document, refers to light reflected from a smooth surface so the angle of incidence equals the angle of reflection and the incident, normal, and reflected directions are coplanar.

Figure 4:
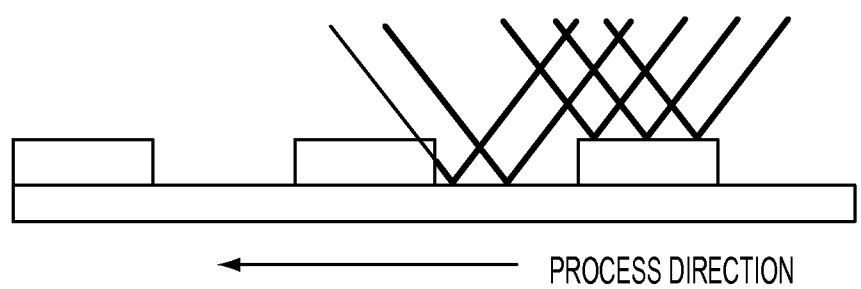
FIG. 4 depicts the sensor module of FIG. 3 scanning a plurality of test objects for identifying building material drop mass/volume of a second embodiment of the printer of FIG. 1.

The bottom edge of the housing 310 is separated from the build substrate by a distance D. In one embodiment, D is in the range of about 2 mm to about 5 mm. As shown in FIG. 3, either the module 300 or the planar support member 34 can be moved to pass the build substrate 30 past the sensor 300 or the sensor 300 can pass over the build substrate 30. As the light from the illumination source 320 strikes the build substrate 30, it is reflected into the self-focusing lens 324. The self-focusing lens 324 gathers the specular light and focuses it onto at least one chip in the array 328, which generates an electrical signal corresponding to the amount of light received through the self-focusing lens 324 from the build substrate 30. As the light reaches a leading edge of one of the two objects, the sensor 330 no longer receives reflected light since it is blocked by the object and the electrical signals generated by the photodetectors correspond to no light being received. The sensor 300 remains blocked until the light from the illumination source strikes the top surface of the object and the sensor begins generating electrical signals indicative of the reflected light being received. As the sensor 300 passes the back edge of the object, the light strikes the build substrate 30 at a position that is past the back edge of the object, since the light source 320 is tilted, and continues to be reflected into the sensor 300 of the photodetector array. The position where the light strikes the build substrate 30 is proportional to the height of the structure. The photodetectors continue to generate electrical signals indicative of reflected light being received until the leading edge of the next object blocks the sensor 300. Thus, the distance between the blocking of the photodetector array by the first object to the blocking of the photodetector array by the second object corresponds to the height of the first object and the height of the second object. This blocking and unblocking of the photodetector array by objects of the same height is shown in FIG. 4.

Using the basic geometry of the sensor 300 and the heights of the two test objects, the slope and offset of the light received at each photodetector can be identified. The offset is the distance in the process direction between the left edge of the test object in FIG. 4 and the rightmost point where the illumination hits the substrate. In other words, the offset is the length of the shadow of the test object in the process direction. The slope is the angle of the illumination with respect to a vector normal to the substrate. The slope is a measure of the height/volume ratio. The slope or volume accuracy can be increased by slowing the relative movement in the process direction of the build substrate 30 and the sensor 300 to enable a higher number of photodetector readings to be received per unit length and using the measured illumination by the photodetector to get sub-scan line resolution. An ideal specular sensor suddenly goes from dark to light when the beam of light hits the top edge of the test target. Due to the finite angle distribution of collected light together with the integrated effect in a photodetector during constant speed scanning, a gradual change in illumination is detected over at least 1 or 2 scan lines. Choosing a specific illumination level as a threshold that lies between the maximum illumination and the minimum illumination can be used to get better accuracy. Alternatively, detection of both the leading edge and the trailing edge of the target could increase accuracy and/or provide the benefits of identifying a different target edge where a light ray needs to go through the material. If the transmission is close to zero and the diffuse reflectance from a surface of an object is close to the specular reflectance from a surface of the build substrate 30, then the edge of the object blocking the light ray can provide a more defined transition, if that is needed. Additionally, the number of targets can be increased in the process direction to increase the precision of the edge detection and slope measurements by averaging multiple measurements.

Figure 5:
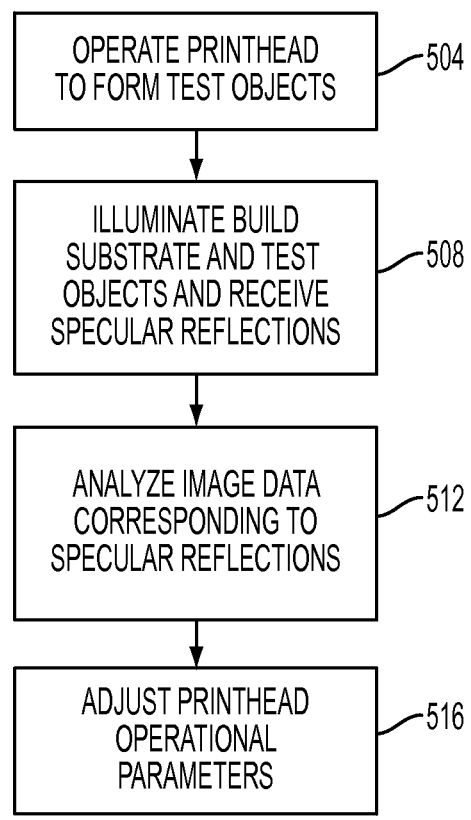
FIG. 5 is a flow diagram of a process for operating the printer of FIG. 1 that uses the sensor module of FIG. 3 to identify the height of test objects.

A method of operating a printer that produces three dimensional objects is shown in FIG. 5. In the description of this method, statements that a process is performing some task or function refers to a controller or general purpose processor executing programmed instructions stored in a memory operatively connected to the controller or processor to manipulate data or to operate one or more components in the printer to perform the task or function. The controller 46 noted above can be such a controller or processor. Alternatively, the controller 46 can be implemented with more than one processor and associated circuitry and components, each of which is configured to form one or more tasks or functions described herein.

The process 500 begins with operation of the printhead to form at least two objects on the planar support member (block 504). During the formation of the objects, the controller operates an actuator to move one of the planar support member and the printhead relative to the other of the planar support member and the printhead. This movement is performed in a manner that enables the at least two objects to be formed with a length in a cross-process direction that substantially covers a width of the printhead across the planar support member and with a length in the process direction that extends along a portion of the planar support member in a process direction. As noted above, the printhead can also be operated to form test objects having different heights. Process 500 operates the specular sensor array in the module 300 to direct light towards the planar support member and to receive the electrical signals generated by the light receivers as one of the specular sensor array and the planar support member move relative to the other of the specular sensor array and the planar support member (block 508). The process can also control the specular sensor array and the planar support member to move relative to one another at different speeds to select a resolution for the image data in the process direction. The process analyzes image data corresponding to the electrical signals received from the light receivers to identify an offset of reflected light received by one of the light receivers and the relative height between the two objects (block 512). In this analysis, the slope of the distance covered by a shadow versus the thickness or height of the target objects is obtained by comparing the two distances in the shadows formed by the two objects of different heights and taking a ratio of dx/dy. In the ratio dx/dy, dx is the change in the shadow distance and dy is the change in the heights of the two objects. The shadow distances are identified by the light sensors detecting a transition from light to darkness and then darkness to light at the edge of each object. The expected heights of the objects are obtained from the data used to build the target objects. Once these data are identified, the process adjusts an operational parameter of the printhead in response to the analyzed image data indicating a mass of material drops ejected by an inkjet in the printhead has changed with reference to a predetermined material drop mass (block 516).

Some variations in this process include the process operating the illumination source to emit different colors of light for reasons noted below. Additionally, in embodiments in which the photodetectors are configured to generate the electrical clock signals that define a plurality of integration periods, the controller performing the process can be further configured to select one of the integration periods at which the photodetector array 328 generates the electrical clock signals. The integration period change affects the amount of time that the array 328 receives light and then generates a corresponding electrical signal. Consequently, this operation affects the resolution of the image data in the process direction.

Figure 6:
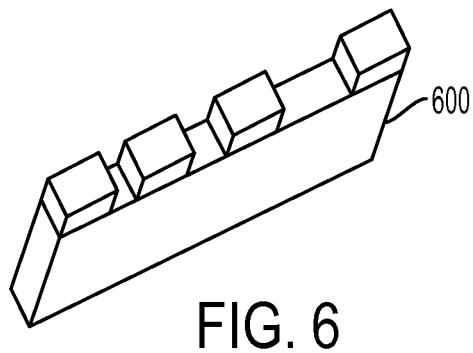
FIG. 6 is an alternative configuration of a test object.

The configuration of the test objects can altered to facilitate the identification of the object height or to improve the image data analysis. For example, the square wave upper surface in the test object 600 shown in FIG. 6 can be used to isolate short cross process regions, test three dimensional print density effects, and help with deconvolving of the distribution of the light cone angle from individual inkjet performance.

Figure 7:
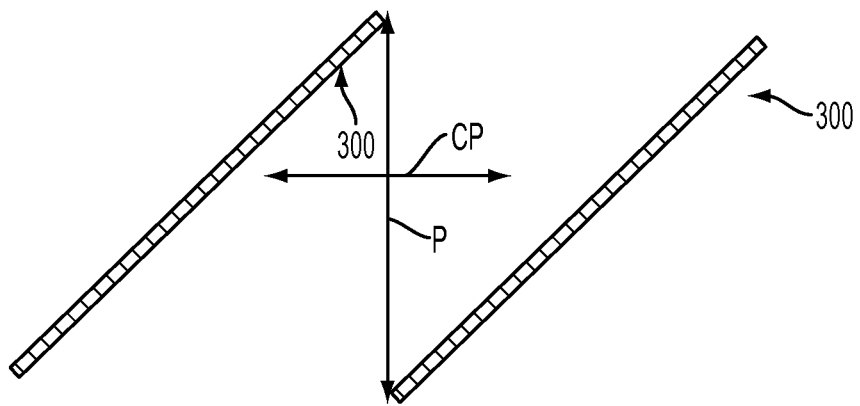
FIG. 7 is a diagram exemplifying how cross-process resolution can be increased by rotating multiple optical sensors with respect to the cross-process direction.

Cross-process measurement accuracy can be improved with a number of changes to the process noted above. For one, a module sensor having more photodetectors in the cross-process direction than the drop per inch resolution of the inkjets in the build material printhead can improve cross-process position accuracy. Another way of improving cross-process accuracy is to rotate the sensor at an angle with reference to the process direction to increase the sampling resolution in the cross process direction for a given cross-process resolution of a module sensor. For example, in FIG. 7, a pair of sensors 300 configured as shown in FIG. 3 are shown rotated at a 45 degree angle to the cross-process direction CP. If the resolution of the photodetector array prior to rotation was 600 dots per inch (dpi), the resolution in the cross process direction at the rotated position is $600/\sin(45°)=600/0.707=848$ dpi. The more the arrays are rotated, the greater the increase in the resolution in cross process direction and the greater need for more chips in the array to cover the full cross direction. Large rotation angles can be achieved in a limited area by rotating multiple shorter sensors and stitching the captured images together, for example, at the process direction line P shown in FIG. 7. Practical limitations to this approach arise from stitching between sensors, the amount of process direction space required to position the arrays, and the number of sensors needed in the arrays.

Cross-process accuracy can also be improved by deconvolving the signal from a photodetector with reference to the cross-process cone angle distribution of light at the photodetector. Additionally, cross-process accuracy can be improved by translating the sensor module in the cross process direction by a distance that is less than the distance between the chips in the photodetector array 328 to enable sub-sampling at a higher resolution. These approaches can be combined or performed iteratively to improve cross-process measurement accuracy. Additionally, the reflected transmission uniformity locally through the shorter object provides a more accurate reading at the focal point of the photodetector since the cone angle effect at the focal point is small.

Figure 8:
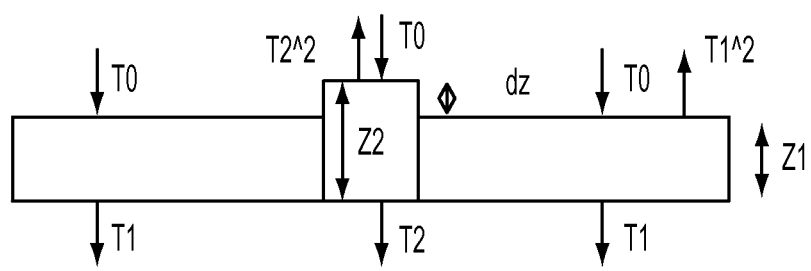
FIG. 8 is a schematic diagram depicting light absorption and reflection by the ejected material and the use of Beer's law to identify a mass of the material ejected by an inkjet.

Beer's law for absorption and use of a light color from the illumination source can also be used as another mechanism to identify the thickness of the build material on the substrate. Beer's law can be stated as $T=T_0 * e^{\alpha z}$ where T0 is incident light and T is transmitted light through an absorbing layer of thickness z and absorption coefficient $\alpha$. If the substrate below the build material is completely reflective, then the light reemitted from the surface of the layer makes two passes through the build material. In that case, the light reflected into the sensor due to reflection of the substrate is $T_1=T_0 e^{-2\alpha z_1}$ for light traversing material of thickness $z_1$ and $T_2=T_0 e^{-2\alpha z_2}$ for light traversing material of thickness $z_2$. When $\alpha z_1$ and $\alpha z_2$ are much smaller than 1, the ratio of $T_2/T_1=e^{(-2\alpha(z_2-z_1))}=1-2\alpha(z_2-z_1)$ and $dz=z_2-z_1$. FIG. 8 is a schematic diagram that depicts this scenario. In the example of FIG. 8, $T_1=0.90$, $T_2=0.89$, so $e^{-2\alpha z_1} \approx 1-\alpha z_1=0.9$ or $\alpha z_1=0.1$. Also, $e^{(-2\alpha(z_2-z_1))} \approx 1-\alpha(z_2-z_1)=1-\alpha\Delta z=0.89$ or $\alpha\Delta z=0.11$. Taking the ratio of these two quantities gives $\alpha\Delta z/\alpha z_1=\Delta z/z_1=0.11/0.1=1.1$, which means that the inkjet ejects a drop with 10% more mass. Thus, a controller can be configured to identify a thickness difference between two areas of the ejected material using this method. The thickness difference is identified by the controller with reference to an absorption coefficient of the ejected material, the electrical signals corresponding to the light sensed by the specular sensor array, and a location of the specular sensor array with respect to the illumination source.

Accuracy can be increased in all directions by averaging over several test objects or several photodetectors. Once the height of each object is accurately determined at each photodetector, an inverse correction can be applied to the operational parameters of the printer. For example, if the height is too high at a given location on the edge of an object, the drop mass/volume for the inkjet is reduced so the inkjet ejects less material. These adjustments include known methods, such as changes to the shape of firing signal waveforms. The amount of the reduction is a function of the mass of the drops ejected by the inkjet that resulted in the identified height at the detected edge. With knowledge of the number of drops per unit area that resulted in a structure of a given height, the sensitivity of height to drop mass/volume can be determined and an adjustment made to reduce the mass/volume of the drops ejected by the inkjet. The identified offsets enable the height measurements to be corrected for misplaced building material drops. The accuracies of measurements in all directions can be improved by averaging the identified heights and edge positions over several objects or photodetectors. Also, iterative measurement and correction can be useful for measurement accuracy. Depending on various factors, including the number of drops per inch, drop spreading, and the like, averages can be identified over several inkjets.

Many practical considerations arise in the implementation of the above system and method for drop mass/volume identification. These considerations include whether to place the test objects on a special zone of the planar support member or to use the surface of the planar support member during a set-up phase. Additionally, different types of specular surfaces can be used and these surfaces affect the allowed cone angles for receiving light in the photodetectors and the wavelength of light emitted from the illumination source. Also, different support substrates affect the transmission contrast so some substrates enable the objects to be scanned on the support substrates, while others do not.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:
1. A printer comprising:
a planar support member;
a printhead positioned to eject drops of material towards the support member, at least one of the planar support member and the printhead being configured to move relative to the other of the planar support member and the printhead;
a specular sensor array having an illumination source and a plurality of light receivers, the illumination source being configured to emit light at a predetermined angle to the planar support member and each light receiver being configured to generate an electrical signal corresponding to light reflected from ejected material on the planar support member; and a controller operatively connected to the planar support member, the printhead, and the specular sensor array, the controller being configured to:

operate the printhead to form at least two objects on the planar support member;

operate one of the planar support member and the printhead to move relative to the other of the planar support member and the printhead to enable the at least two objects to have a length in a cross-process direction that substantially covers a width of the printhead across the planar support member and have a length in a process direction that extends along a portion of the planar support member in a process direction;

operate the specular sensor array to direct light towards the planar support member and receive the electrical signals generated by the light receivers as one of the specular sensor array and the planar support member move relative to the other of the specular sensor array and the planar support member;

analyze image data corresponding to the electrical signals received from the light receivers to identify a ratio between a difference in shadow distances identified by a response of the light receivers to reflected light at an edge of the two objects and a difference in height between the two objects; and adjust an operational parameter of the printhead in response to the analyzed image data indicating a mass of material drops ejected by an inkjet in the printhead has change with reference to a predetermined material drop mass.

2. The printer of claim 1 wherein the illumination source and the plurality of light receivers in the specular sensor array extend in the cross-process direction along a distance corresponding to the width of the printhead in the cross-process direction.

3. The printer of claim 1, the illumination source is further configured to emit at least two colors of light; and the controller being further configured to select one of two colors of light to be emitted by the illumination source.

4. The printer of claim 1, the plurality of light receivers being configured to generate the electrical clock signals for a plurality of integration periods; and the controller being further configured to select one of the integration periods during which the light receivers generate the electrical signals.

5. The printer of claim 1, the controller being further configured to:

operate the printhead to form at least a portion of one object at a first predetermined height and to form the second object at a second predetermined height, the first predetermined height being greater than the second predetermined height.

6. The printer of claim 5, the controller being further configured to:

operate the printhead to form the at least portion of the one object at the first predetermined height that is ten times greater than the second predetermined height.

7. The printer of claim 5, the controller being further configured to:

operate the printhead to form the portion of the one object at the first predetermined height and to form another portion of the one object at a third predetermined height, the third predetermined height being less than the first predetermined height and greater than the second predetermined height.

8. The printer of claim 1, wherein a number of light receivers are greater than a number of drops per inch that the printhead can eject in a line extending in the cross-process direction.

9. The printer of claim 1, the controller being further configured to move the specular sensor array in the cross-process direction to enable an increased resolution of the image data in the cross-process direction.

10. The printer of claim 1, the controller being further configured to move the specular sensor array in the process direction to enable an increased resolution of the image data in the process direction.

11. The printer of claim 1 wherein the specular sensor array is rotated with reference to the process direction to enable a sampling resolution of the specular sensor array to be increased in the cross-process direction.

12. The printer of claim 1, the controller being further configured to identify a thickness difference between two areas of the ejected material, the thickness difference being identified with reference to an absorption coefficient of the ejected material, the electrical signals corresponding to the light sensed by the specular sensor array, and a location of the specular sensor array with respect to the illumination source.

* * * * *